March 22, 1966  M. L. ANTHONY  3,242,472
MEASURING APPARATUS
Filed Oct. 9, 1961  3 Sheets-Sheet 1
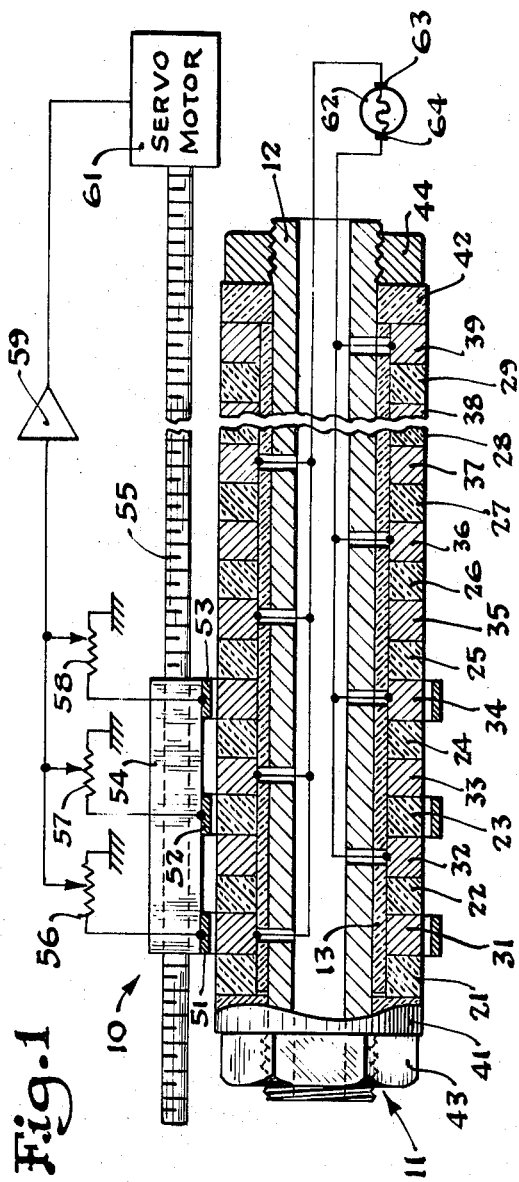
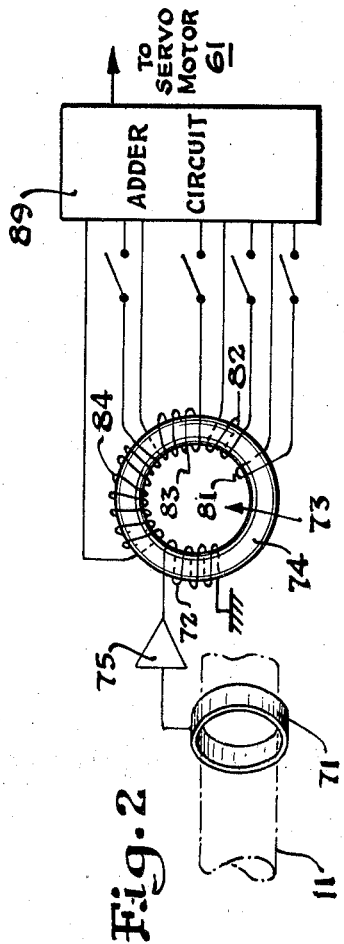
Inventor
Myron L. Anthony
By Wallace, Kinzer and Dorn
Attorneys

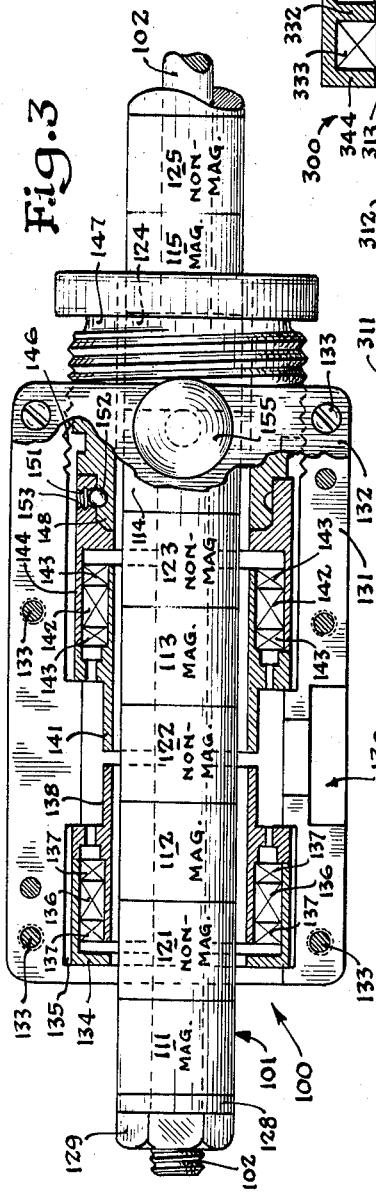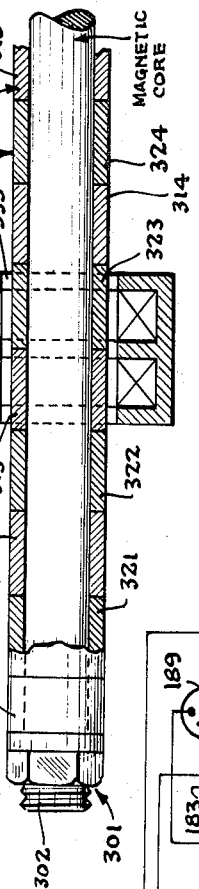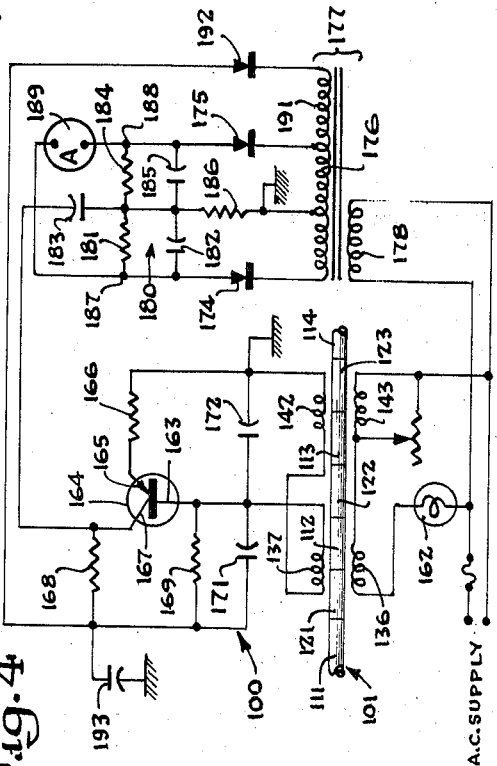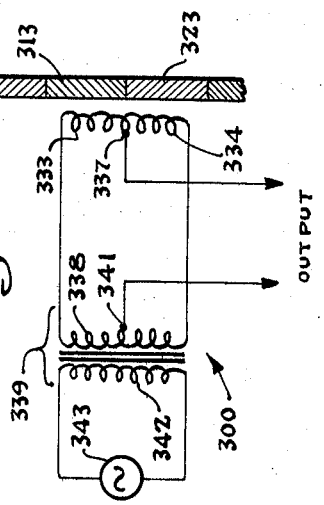
March 22, 1966 — M. L. ANTHONY — 3,242,472
MEASURING APPARATUS
Filed Oct. 9, 1961 — 3 Sheets-Sheet 2
Inventor
Myron L. Anthony
By Wallace, Kinzer and Dorn
Attorneys March 22, 1966 M. L. ANTHONY 3,242,472
MEASURING APPARATUS
Filed Oct. 9, 1961 3 Sheets-Sheet 3

Inventor
Myron L. Anthony
By Wallace, Kinzer and Dorn
Attorneys

United States Patent Office 3,242,472
Patented Mar. 22, 1966

3,242,472
MEASURING APPARATUS
Myron L. Anthony, La Grange, Ill.
Filed Oct. 9, 1961, Ser. No. 144,525
4 Claims. (Cl. 340—196)

This invention relates to a new and improved precision measuring apparatus which operates on the basis of differences in the field-coupling properties of individual division elements of a gauge member. The invention also relates to a new and improved gauge member suitable for use in such a measuring apparatus. This application is a continuation-in-part of application Serial No. 70,825, filed November 21, 1960, now abandoned.

Precision measuring devices which produce electrical signals identifying the position of a movable member relative to a fixed member, or vice versa, are increasingly important in various applications, and particularly in the machine tool art. This is especially true where machine tools are controlled electrically, as in the case of machine tools subject to at least some degree of automatic control in response to numerical data previously recorded in one form or another. Measuring systems having the requisite degree of accuracy and repeatability in operation have been devised, but previously known systems have generally been rather expensive to manufacture. Furthermore, known measuring systems of this general kind have presented at least some difficulties with respect to maintenance of accuracy under varying thermal conditions and may also be subject to errors introduced by variations in alignment of critical parts of the measuring apparatus. In particular, previously known systems have required extreme precision in the manufacture of at least one gauge element or member, which must usually be produced by means of expensive precision manufacturing equipment such as a highly accurate ruling engine. Some of the known systems have utilized physical sensing elements to determine the position of one portion of the gauge relative to another, introducing a substantial possibility of error, due to wear, in the continuing use of the system. Consequently, it is seen that measuring apparatus of this kind presents a substantial problem with respect to cost and performance, and may in many instances add materially to the difficulty of automatic control of a device such as a machine tool.

It is a principal object of the present invention, therefore, to provide a new and improved precision measuring apparatus which effectively and inherently overcomes the problems and difficulties noted hereinabove in connection with previously known devices.

Another basic object of the invention it to provide a new and improved gauge member or assembly, suitable for use in a measuring apparatus actuated by differences in the field-coupling properties of individual division elements of the gauge assembly.

A particular object of the invention is to provide a new and improved measuring apparatus which operates solely by sensing of the electrical or magnetic properties of a gauge member and which eliminates physical contact between the moving and stationary portions of the gauge system.

Another object of the invention is to provide a new and improved measuring apparatus of the kind actuated by the electrical or magnetic properties of a gauge member and which is effective to compensate for any minor variations in alignment between the moving and stationary members of the measuring system.

A further object of the invention is to provide inherent and effective compensation for variations in dimensions of the principal gauge member, in a precision measuring apparatus, caused by changes in the operating temperature of that member.

A particular object of the invention is to eliminate any need for the use of precision gauge-manufacturing or elaborate calibrating apparatus, such as a ruling engine, in the manufacture of a gauge member or assembly suitable for use in a precision measuring apparatus.

An additional object of the invention is to provide a new and improved means for adjusting the total length of a precision gauge member which at the same time is effective to distribute any change in the gauge member length uniformly between the individual divisions of the gauge member.

Another object of the invention is to provide a new and improved precision measuring apparatus that is simple and economical in manufacture yet affords precision measurements comparable to more expensive prior art devices.

A measuring apparatus constructed in accordance with the invention comprises a first group of division elements having uniform field-coupling properties and having essentially uniform dimensions. This first group of division elements is mounted in an assembly with a second group of division elements, the second group of division elements having uniform field-coupling properties that are substantially different from the first group and being uniform, also, in their dimensions. By way of an example, the first group of division elements could be electrically conductive and the second group electrically non-conductive, or the first group could be formed from magnetic material and the second group from non-magnetic material. The division elements are assembled in fixed alignment with each other and in abutting relation to each other with the division elements from the two groups being disposed in alternation in the assembly. The total effective length of the assembly is determined by the dimensions of the division elements. The measuring apparatus further includes sensing means comprising at least two sensing elements of given axial length disposed in juxtaposition to the aforementioned assembly of division elements, the sensing means and the assembly being movable relative to each other. The effective axial length of the sensing elements is made essentially similar to the axial lengths of the division elements, with permissible variations dependent to some extent on whether electrical or magnetic field-coupling properties are utilized. The sensing means is utilized to develop signals representative of the field-coupling properties of the division elements disposed adjacent thereto. The sensing elements are disposed in encompassing relation to, but out of contact with, the division element assembly. It is these electrical signals, produced by the sensing means, which are utilized to determine the precise position of the sensing means longitudinally of the division element assembly in accordance with sharply defined null signal conditions.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of appended claims.

In the drawings:

FIG. 1 is a sectional view, partly schematic, of a measuring apparatus constructed in accordance with one embodiment of the present invention and based upon the electrostatic field-coupling properties of a gauge member;

FIG. 2 is a schematic diagram of a circuit which may be employed in the embodiment of FIG. 1 to modify the operation thereof to some extent;

FIG. 3 is a partly sectional plan view of a measuring apparatus constructed in accordance with another embodiment of the invention and based upon the magnetic properties of a gauge member;

FIG. 4 is a schematic diagram of an operating circuit for the embodiment of FIG. 3;

FIG. 9 is a sectional view of another magnetic measuring apparatus according to the invention; and FIG. 10 is a simplified circuit diagram for the device of FIG. 9.

Figure 5:
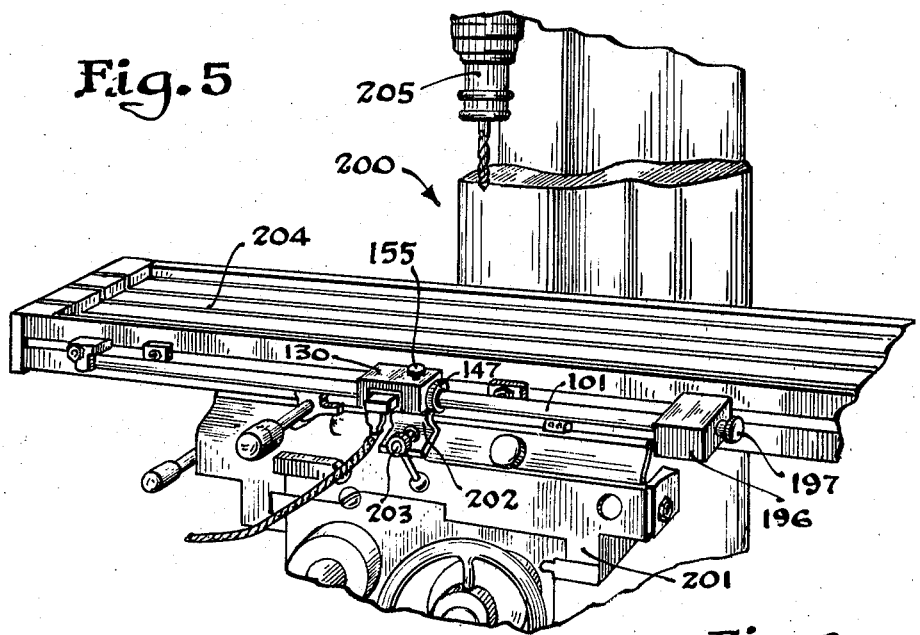
FIG. 5 is a perspective view illustrating the measuring apparatus of FIG. 3 as applied to a machine tool.

FIG. 1 illustrates a measuring apparatus 10 constructed in accordance with one embodiment of the present invention; operation of the measuring apparatus 10 is based upon the sensing of electrostatic field-coupling properties of individual division elements of a gauge member or gauge assembly 11. The gauge member 11 comprises a central core or support member 12 which, in this instance, is a relatively heavy rigid steel pipe. The support member 12 could be solid in cross-sectional configuration, but, in this instance, is of tubular configuration to permit the completion of electrical circuits therethrough as described more fully hereinafter. The central portion of the support member 12, including a major longitudinal portion of the support member, is encased in an insulator sleeve 13.

The gauge assembly 11 includes a first group of division elements 21, 22, 23, 24, 25, 26, 27, 28 and 29 that are mounted upon the sleeve 13 and, accordingly, on the support member 12. The division elements 21–29 are all preferably constructed from the same material and must have essentially uniform field-coupling properties. In this instance, the division elements 21–29 are all formed from a material which is a good electrical insulator; that is, a material having a high dielectric constant. The division elements 21–29 are of uniform dimensions and, as can be seen from FIG. 1, are really nothing more or less than a series of washers. By way of example, these division elements may be fabricated from steatite or from glass; preferably, a material is selected that has a thermal co-efficient of expansion approximately equal to that of the core 12. Of course, the gauge member 11 is not restricted to the use of only nine division elements of this first group; in a practical embodiment of the invention, there might well be a much larger number of individual division elements in this group.

The gauge member 11 further includes a second group of division elements 31–39 which are mounted upon the insulator sleeve 13, and hence upon the support member 12, in alternation with the first group 21–29 of division elements. Like the first group of division elements, the elements of the second group 31–39 exhibit uniform field-coupling properties, but these properties are substantially different from the division elements of the first group. In the gauge member 11, this second group of division elements is formed from an electrically conductive material, as contrasted with the dielectric material used for the elements 21–29. The dimensions of the division elements 31–39 are consistently uniform. Preferably, they are made essentially equal in all dimensions to the washers 21–29, although this is not essential as long as the elements of each group are consistent with each other and the axial lengths are approximately equal.

In the gauge member 11, means are provided for holding the division elements 21–29 and 31–39 on the support member 12 in abutting relation with each other and preferably under an appreciable compressive force. This means comprises a pair of retaining washers 41 and 42 which are disposed at the opposite ends of the gauge member 11, being mounted directly on the tubular support member 12 in abutting relation to the end division elements 21 and 39, respectively. The ends of the support member 12 are threaded, and a pair of retainer nuts 43 and 44 are mounted on the support member in engagement with the retainer washers 41 and 42. Thus, it can be seen that the effective length of the gauge assembly 11, which is determined by the division elements 21–29 and 31–39, can be adjusted by adjustment of the compression applied thereto by tightening or loosening the two retainer nuts 43 and 44.

The measuring apparatus 10 further includes sensing means for developing electrical signals representative of the field-coupling properties of the division elements of the gauge member 11. This sensing means comprises three electrically conductive pickup rings 51, 52 and 53. The sensing elements 51–53 are suspended from or otherwise mounted upon a carriage 54 that is supported upon a lead screw 55. The conductive rings 51–53 do not physically engage the gauge member 11; rather, a relatively small spacing is maintained between the gauge bar 11 and the sensing rings. The sensing rings extend completely around the gauge bar to afford inherent compensation for radial displacement or any tilting of the gauge bar relative to the path of movement of the carriage 54 along the lead screw 55. The axial lengths of the individual sensing elements 51–53 should be equal to each other and should be approximately equal to the lengths of the individual division elements of the gauge bar 11.

The conductive pickup ring 51 is electrically connected to one terminal of a potentiometer 56, the other terminal of the potentiometer being returned to a plane of reference potential here indicated as ground. Similarly, the conductive ring 52 is connected to a potentiometer 57 and the pickup ring 53 is connected to a potentiometer 58. The variable taps on the three potentiometers 56–58 are connected to the input of an amplifier 59 which is coupled to a servo motor 61. The motor 61 is utilized to drive the lead screw 55 to move the carriage 54 along the gauge bar 11.

The measuring apparatus 10 also includes means for applying energizing signals to the conductive division elements 31–39 of the gauge bar 11. This portion of the apparatus comprises an A.C. source, schematically indicated as the generator 62. One terminal 63 of the generator 62 is connected to alternate ones of the conductive division elements; that is, the terminal 63 is connected to each of the conductive division elements 31, 33, 35, 37 and 39. The other pole or terminal 64 of the A.C. source 62 is connected to the remaining conductive division elements of the gauge assembly, being connected to division elements 32, 34, 36 and 38. Thus, when the even-numbered conductive division elements are energized with a positive polarity signal, a negative polarity signal is supplied to the odd-numbered division elements, and vice versa. Accordingly, alternate ones of the conductive division elements are supplied with A.C. signals that are 180° out of phase relative to each other.

In considering operation of the embodiment of FIG. 1, it may first be assumed that the carriage 54, which may be considered to represent the carriage of a machine tool or the like, is located in the illustrated position with respect to the gauge member 11 and that the potentiometers 56 and 58 are adjusted to approximately equal values. With the A.C. source 62 in operation, signals are induced in the pickup rings 51 and 53, due to capacitive coupling to the rings 31 and 34, that are opposite in polarity. With the potentiometers 56 and 58 adjusted to equal values, these two signals effectively cancel each other in the input of the amplifier 59, since they are 180° displaced in phase from each other as noted hereinabove. Only a negligible signal is induced in the pickup ring 52 since this pickup device is disposed intermediate the two conductive rings 32 and 33, and these division elements are energized with signals of opposite polarity. Thus, the gauge system 10 remains stable in the illustrated position.

To effect a change in one direction, the potentiometer 56 may be adjusted to afford a substantially smaller output signal than is derived from the potentiometer 58. When this is done, the servo motor 61 is energized by the differential signal supplied thereto from the amplifier 59. As a result, the lead screw 55 is rotated in a given direction determined by the phase of the input signal supplied to the amplifier 59. Suitable servo amplifiers and motors for achieving this result are known in the art. As a consequence, the carriage 54 is driven to the right, as seen in FIG. 1, reducing somewhat the signal developed by the sensing ring 51 and the potentiometer 56 but increasing to a substantial extent the output signal from the intermediate sensing ring 52 and the associated potentiometer 57. By the same token, the potentiometer 58 may be adjusted to achieve the same result. The potentiometer may be adjusted to afford a precise vernier action in determining the final carriage position. The carriage 54 is driven to a point at which the signal input to the amplifier 59 is again approximately zero, at which point movement of the table is interrupted, having been precisely positioned by means of the servo system comprising the pickup elements 51–53, the amplifier 59, the motor 61, and the lead screw 55.

Movement in the opposite direction is achieved in essentially the same manner by adjusting one or more of the potentiometers 56–58 to achieve an unbalanced electrical condition at the input to the amplifier 59. When this signal is in phase opposition to that in the example given hereinabove, the carriage 54 is moved to the left until the system again reaches electrical stability. It is thus seen that precise positioning of the carriage 54 is established by determination of a series of stable null-signal positions along the gauge bar.

Highly accurate positioning of the sensing means carried by the carriage 54, and hence of the carriage itself, can be achieved with the system described hereinabove. Moreover, this is accomplished without entailing excessive expense in the construction of the gauge bar 11. Thus, if the division elements of the gauge bar 11 are made approximately one-tenth of an inch in length, longitudinally of the support member 12, the sensing system described hereinabove makes it possible to achieve position accuracies of the order of $10^{-4}$ inch and, with careful pre-alignment and accurate assembly of the sensing means and the gauge bar, even higher resolution or sensitivity of the order of $10^{-6}$ inch may be achieved.

In the construction of the gauge bar or assembly 11, the exact axial length of each division element is not the most critical factor. Furthermore, it is not necessary that the conductive division elements 31–39 have the same critical length as the insulator elements 21–29. For example, the conductive elements 31–39 could be made somewhat longer, axially of the core 12, than the insulator washers 21–29. The most important and critical length, in the construction of the gauge bar 11, is that of each pair of division elements or washers. That is, for the utmost precision, the effective length of each pair of washers, such as the pair 21, 31 should be made as nearly equal to the total length of the next pair 22, 32 as possible.

The relative axial lengths of the sensing elements 51–53 and the division elements of the gauge bar is also important to accurate measurement with the device 10. If the sensing elements were made substantially smaller, axially, than the division elements, then a slight movement of the gauge bar from the balanced null position (FIG. 1) would produce no sensible change in signal output. Thus, the critical null-signal position would be elongated and precision measurement lost. A gross enlargement of the sensing elements relative to the gauge bar elements, in an axial direction, produces a similar result. Thus, if the axial length of each sensing element spans several division elements, the system becomes essentially inoperative, the gauge bar appearing virtually homogenous to the sensing elements. Hence, the division elements and the capacitor pickup rings should be made approximately uniform in length. The sensing elements should also be spaced from each other by an odd integral multiple of the division element lengths, as shown in FIG. 1 and in succeeding embodiments of the invention.

In the manufacture of the washer-like division elements, both conductive and non-conductive, substantial economies may be realized as compared with the traditional means of fabricating precision gauge members, as by the use of ruling engines and the like. Substantial numbers of washers may be manufactured and the size of the washers can be held to close tolerances by using lapping techniques and similar methods for finishing the surfaces. In this manner, close control can be maintained of the lengths of the washers, in an axial direction, without undue expense. Furthermore, at the time the gauge bar 11 is assembled, it is possible to match individual pairs of washers to obtain even better control of this critical dimension. Another method which may be utilized in obtaining accurate axial dimensions in the division elements of the gauge member 11 is to plate the gauge members to the desired ultimate thickness after initially fabricating them slightly under-size. The important feature of the gauge assembly 11 is that it is a built-up device and is not constructed by precision ruling of a pre-existing unitary member. Furthermore, a final adjustment of the gauge member can be achieved by tightening the end nuts 43 and 44 to compress the entire gauge assembly. Compressive forces applied to the opposite ends of the assembled division elements are distributed substantially equally throughout the length of the gauge bar, since the division elements themselves are slidable along the sleeve 13 on the main support member 12. Thus, at the time the gauge bar is assembled, a slight over-size condition can be easily, accurately, and uniformly corrected by tightening of the ends 43 and 44. To take advantage of this adjustment procedure, of course, it is necessary that all tolerances be expressed as permitted over-size variations, since it is not possible to expand the length of the bar if it is under-size initially.

The measuring apparatus 10 of FIG. 1 is essentially an analog device, and thus the potentiometers 56–58 must be accurately calibrated to achieve the desired position interpolating results. Moreover, the variations in electrical signal strength are not necessarily linearly related to the position of the sensing apparatus longitudinally of the gauge bar 11. FIG. 2 illustrates an operating circuit that may be utilized in FIG. 1 instead of the potentiometers 56–58 in order to achieve a digital setting arrangement for the measuring apparatus. In FIG. 2 there is shown a conductive pickup ring 71 that is disposed in encompassing relation to the gauge bar 11. The ring 71 may be considered to represent any one of the three pickup rings 51–53 of the embodiment of FIG. 1. The pickup ring 71 is connected to the primary winding 72 of a conversion transformer 73 having a toroidal core 74. A suitable amplifier 75 may be connected in the circuit coupling the pickup ring 71 to the winding 72.

The conversion transformer 73 is provided with four individual secondary windings 81, 82, 84 and 88. The number of turns in each of the secondary windings is different. Thus, for a given input signal supplied to the primary 72, the windings 81, 82, 84 and 88 may be constructed to afford different output signals having amplitudes representative of movements of 0.1, 0.2, 0.4 and 0.8 of the axial length of one of the gauge bar division elements. The secondary windings of the transformer 73 are electrically connected to an adder circuit 89, a switch being provided in each of the connecting circuits. The adder circuit 89, in turn, is connected to the servo motor 61 through a suitable circuit which may include an amplifier such as the amplifier 59 (FIG. 1). It should be understood that three circuits of the kind shown in FIG. 2 are required in order to afford a complete interpolation circuit for the measuring apparatus comparable to the interpolation circuit afforded by the potentiometers 56–58. The circuit of FIG. 2 makes it possible to set up desired movement of the measuring apparatus on the basis of digital data rather than analog data, facilitating use with numerical data control systems.

FIGS. 3 and 4 illustrate a further embodiment of the invention in which sensing is accomplished in accordance with changes in magnetic properties of the gauge bar division elements instead of relying upon the electrostatic properties as in the arrangement of FIG. 1. The measuring apparatus 100 illustrated in these figures comprises a magnetic gauge bar 101. A steel rod 102 constitutes the support member of the gauge bar 101. On this rod 102 there are mounted a first group of division elements 111, 112, 113, 114 and 115 which are formed from a high permeability magnetic material. Typically, the division elements 111–115 may be formed from steel having a relatively good aging or "creep" characteristic; preferably, the steel used is of the same kind employed in the fabrication of machine tools as explained hereinafter. The gauge bar 101 further includes a second group of division elements 121, 122, 123, 124 and 125 which are mounted upon the support rod 102 in alternation with the elements 111–115. The division elements 121–125 are constructed to essentially uniform dimensions and this is also true of the first group of division elements 111–115. Furthermore, in the preferred construction shown in FIG. 3, the dimensions of the first group of division elements are identical to those of the second group, although the group dimensions can be slightly different as long as there are no deviations in axial length between elements of the same group. The division elements 121–125, however, are fabricated from a low permeability material and thus exhibit substantially different magnetic field-coupling properties from the division elements of the first group. Typically, the division elements 121–125 may be fabricated from a non-magnetic stainless steel having good aging characteristics, although other non-magnetic materials may be utilized if desired.

As in the previously described embodiment, the division elements 111–115 and 121–125 are, essentially, washers. The division elements are provided with suitable apertures for receiving the rod 102, the apertures being large enough to permit sliding movement of the division elements along the support member. At the left-hand end of the gauge member 101, as seen in FIG. 3, there is provided a retaining washer 128 and a retaining nut 129, the nut 129 being threaded on to the end of the rod 102. A similar retaining structure is provided at the opposite end of the rod (not shown in the drawings). Thus, the retaining means for mounting the division elements on the rod is essentially the same as in the previously described gauge assembly, the division elements being held under compression and in abutting relation to each other. As before, the two retaining nuts for the gauge assembly can be tightened to afford a limited adjustment of the length of the rod, and this adjustment is distributed equally along the individual rod elements.

The measuring apparatus 100 also includes sensing means comprising a sensing unit 130 that is shown in partial cross-section in FIG. 3. The sensing unit 130 includes a housing 131, 132; preferably, a split housing is utilized, most of the one housing section 132 being cut away in FIG. 3 to show the operating elements of the sensing unit. The two halves of the housing are held together by means of suitable bolts such as the bolts 133.

A first coil casing 134 is mounted within a recess 135 at the left-hand side of the sensing unit 130 as seen in FIG. 3. The coil casing 134 encompasses a pair of transformer coils 136 and 137, the coil 137 being split into two halves which are disposed on opposite sides of the coil 136. A coil mount 138 is provided for the coil and is employed to retain the coils in mounted position within the casing 134. At the right-hand side of the sensing unit 130, a similar coil arrangement is provided. Thus, the sensing unit includes a second coil mount 141 upon which a pair of transformer coils 142 and 143 are mounted, the coil 143 being split into two halves that are disposed on opposite sides of the coil 142. The coils are disposed intermediate the coil mount 141 and the casing 144, the entire coil assembly being disposed in a suitable recess 145 in the housing 131, 132. Coil mounts and casings 134, 138, 141 and 144 are formed of non-magnetic material so that coupling between the transformer windings is varied by the division elements as described hereinafter.

The right-hand end of the housing 131, 132 is provided with a relatively large threaded tapped opening 146 into which a coil centering and adjusting member 147 is threaded. The left-hand portion 148 of the coil centering member, as seen in FIG. 3, is provided with an annular groove 149. The coil casing 144, on the other hand, is provided with a plurality of radial tapped apertures, only the one aperture 151 being shown in the drawing. Preferably, three or more such apertures are provided. At the base of each of the openings such as the aperture 151, a small ball bearing 152 is disposed in engagement with the annular groove 149 in the coil centering member 147. The ball 152 is held in place by a suitable set screw 153. The ball bearings, such as the ball 152, are utilized to transmit axial thrust from the coil centering member 147 to the coil casing 144 but permit rotational movement of the centering member without rotating the coil casing or the associated electrical coils. With this construction, it is possible to move the coils 142, 143 axially of the sensing unit 130, relative to the other coils 136, 137. A locking screw 155 is provided to lock the coil centering member 147 in any desired position.

The gauge member 101 extends through the entire sensing unit 130, in an axial direction, but is not physically engaged by the sensing unit or any portion thereof. Thus, the two housing members, the coil casings, the coil mounts, and the centering member of the sensing unit 130 are all provided with central axial apertures which are large enough to permit the gauge bar to extend therethrough without contact and which permit at least some small degree of axial misalignment between the sensing unit and the gauge member without causing the two to engage each other.

FIG. 4 illustrates an operating circuit, usable with the mechanical construction illustrated in FIG. 3, for the measuring apparatus 100. As shown in FIG. 4, the two transformer windings 136 and 143 comprise the primary winding of a transformer in which the gauge member 101 is the transformer core. The windings 136 and 143 are connected in series with each other across a suitably A.C. supply. A potentiometer 161 may be connected in parallel with one of the windings, such as the winding 143, to afford a means for balancing the sensing unit of the measuring apparatus, electrically, as explained hereinafter. A suitable indicator lamp 162 may be connected in the primary circuit comprising the windings 136 and 143 to serve as a ballast regulator, affording an essentially constant current input to the primary windings.

The windings 137 and 142 constitute the sensing elements of the measuring apparatus 100; they are also connected in series with each other, but in phase opposition. One terminal of the secondary circuit of the transformer is connected to the base electrode 163 of the transistor 164, the other terminal being returned to a plane of reference potential here indicated as ground. The emitter 165 of the transistor 164 is returned to ground through a resistor 166. The collector electrode 167 of the transistor is connected to a load resistor 168 that is, in turn, connected to a suitable D.C. source described more fully hereinafter. The base electrode 163 is also connected to the D.C. source through a bias resistor 169, a capacitor 171 being connected in parallel relation to the resistor 169. In addition, the base electrode 163 is returned to ground through a capacitor 172.

The operating circuit illustrated in FIG. 4 further includes a relatively simple phase detector 180 comprising a pair of diodes 174 and 175. The diodes 174 and 175 are connected in opposed relation to the opposite ends of the secondary winding 176 of a transformer 177. The primary winding 178 of the transformer 177 is connected to the same power supply as is used to energize the primary windings 136 and 143 of the sensing unit 130. The secondary winding 176 is provided with a center tap that is grounded. The cathode of each of the diodes 174 and 175 is coupled to the collector electrode 167 of the transistor 164. For the diode 174, the coupling circuit comprises a resistor 181 connected in parallel with a capacitor 182 and in series with a capacitor 183. The circuit for the diode 175 is similar and comprises a resistor 184 connected in parallel with a capacitor 185 and in series with the coupling capacitor 183. The common terminal of the resistors 181 and 184 and the capacitors 182 and 185 is returned to ground through a resistor 186. Thus, the two diodes 174 and 175 are incorporated in a substantially conventional phase detector circuit, the output terminals of the phase detector being indicated by the reference numerals 187 and 188. An ammeter 189 is shown connected across the output terminals 187 and 188; in an automatic control system, of course, the output signal taken from these terminals would normally be applied to a suitable amplifier and to a motor or other apparatus to incorporate the circuit of FIG. 4 in a servo system.

The power supply for the amplifier transistor 164, in FIG. 4, is quite simple and comprises an additional secondary winding 191 on the transformer 177. The secondary winding 199 is connected to a rectifier diode 192 which, in turn, is connected to the resistors 168 and 169 in the collector and base circuits, respectively, of the transistor. The D.C. supply circuit is by-passed to ground by a suitable capacitor 193. In considering operation of the measuring apparatus 100, it may first be assumed that the transformer windings 136 and 137 are centered at the junction between the non-magnetic gauge bar division element 121 and the magnetic division element 112, as shown in FIG. 4. Because the secondary or sensing winding 137 is a split winding, and the two halves of the winding are disposed on opposite sides of the primary winding 136, this portion of the transformer operates as if both windings were directly centered over the same point. Essentially the same effect can be achieved by utilizing a bifilar winding for the primary and secondary, or by splitting the primary winding and locating the two halves thereof on opposite sides of the secondary winding. When the windings 136 and 137 are located in this position, the windings 142 and 143 are centered at the junction between the magnetic gauge bar division element 113 and the non-magnetic element 123. Before the measuring apparatus 100 is placed in use, it is important to adjust the position of the coils 142 and 143 to achieve this relationship, and this is accomplished by means of the coil centering member 147 (FIG. 3).

With the transformer windings 136, 137, 142 and 143 positioned as described above, and with the primary windings 136 and 143 connected to a suitable A.C. supply, A.C. signals are induced in both of the secondary windings 137 and 142. These windings, however, are connected in phase opposition. Furthermore, the primary and secondary windings of the two sections of the sensing unit 130 are made essentially identical with each other, so that the amplitudes of the signals induced in the secondary windings are equal. It may be necessary to adjust the circuit slightly to obtain equality under these conditions, even with the windings centered as accurately as possible; this may be done by means of the potentiometer 161. Because the signals induced in the secondary windings 137 and 142 are equal in amplitude but opposed in phase, the input signal to the base electrode 163 of the amplifier transistor 164 is negligible and, accordingly, no effective A.C. output signal is produced by the transistor amplifier. This being the case, there is no output signal developed at the output terminals 187 and 188 of the detector 180. This null indication at the phase detector shows that the system is accurately centered at one of the division points on the gauge bar 101.

If the sensing unit 130 is moved to the left along the gauge bar 101, from the position illustrated in FIG. 4, to the position shown in FIG. 3, substantially different signal conditions obtain in the operating circuit. Thus, movement in this direction decreases the portion of the magnetic division element 112 encompassed within the coils 136 and 137 and increases the portion of the non-magnetic division element 121 that is encompassed by these windings. At the same time, the portion of the magnetic division element 113 encompassed by the windings 142 and 143 is increased and a smaller portion of the non-magnetic division element 123 remains within these particular windings. This being the case, the amplitude of the signal induced in the sensing winding 137 is reduced and the amplitude of the signal induced in the sensing winding 142 increases. Because the signals induced in the windings 137 and 142 are in phase opposition, this results in the development of an error signal of substantial amplitude in the input circuit of the transistor 164, the phase of this signal being that of the signal induced in the winding 142. The error signal is amplified and applied to the phase detector 180, which produces a D.C. output signal at the terminals 187 and 188. The output signal from the phase detector is of a polarity determined by the phase of the applied A.C. signal. Accordingly, inspection of the meter 189 affords a clear indication that the sensing unit 130 is no longer accurately centered over a division point on the gauge bar 101.

On the other hand, the sensing unit 130 may be moved to the right, as seen in FIGS. 3 and 4. When this is done, an error signal is again produced in the windings 137 and 142. In this instance, however, the relative amount of magnetic material in the core of the transformer comprising the windings 136 and 137 is increased and that in the transformer section comprising the windings 142 and 143 is decreased. Consequently, the phase of the error signal is reversed from that of the foregoing example, with the result that output signal from the phase detector 180 is of opposite polarity. Thus, the direction in which the sensing unit 130 has been displaced is indicated by the polarity of the output signal from the phase detector 180, and may be directly indicated by the meter 189. Of course, it will be understood that the D.C. output signal from the phase detector 180 may be amplified and utilized to drive a servo motor to bring the sensing unit back into alignment with a division element junction on the gauge bar, as in the embodiment of FIG. 1.

FIG. 5 illustrates the measuring apparatus of FIGS. 3 and 4 as applied to a relatively simple machine tool, and is intended to illustrate one way in which the measuring apparatus may be put to practical use. In FIG. 5, the sensing unit 130 is mounted upon the base 201 of a vertical mill 200. In this instance, the mounting arrangement comprises a suitable bracket 202 that is bolted or otherwise secured to the sensing unit 130 and is affixed to the machine tool base 201 by suitable means such as the locking mount 203. The machine 200 includes a movable table 204 which may be moved from left to right, as seen in FIG. 5, by means of a suitable lead screw or other apparatus (not shown). The gauge bar 101 is affixed to the movable table 204 for movement therewith, and extends through the sensing unit 130 in the manner illustrated in FIG. 3. The machine 200 includes a suitable chuck 205 and other operating components in accordance with conventional construction.

Figure 6:
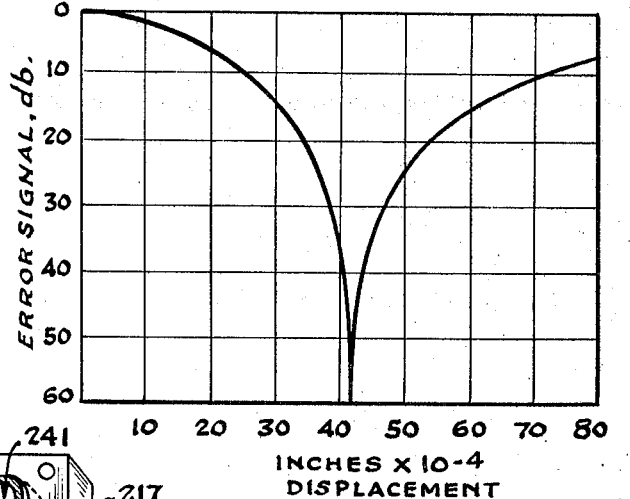
FIG. 6 is an illustrative diagram employed to explain certain electrical phenomena in the operation of the circuit of FIG. 4.

FIG. 6 is an illustrative diagram in which the error signal from the transformer secondary windings 137 and 142 (FIG. 4) is plotted as a function of displacement of the sensing unit 130 relative to a position of accurate alignment with a division point on the gauge bar 101. The high sensitivity of the measuring apparatus 100 is clearly apparent from this illustrative diagram, in which displacement is plotted in ten-thousands of an inch. Thus, a displacement of as little as one ten-thousandth in either direction results in a difference in error signal of approximately 15 db. Accordingly, it is apparent that the measuring apparatus 100 is effective to center the sensing unit 130 at any selected division point along the gauge bar 101 to an accuracy greater than $10^{-4}$. To further illustrate the sensitivity of the system, it may be noted that the circuit of FIG. 4 affords a sensitivity, in terms of the D.C. signal at terminals 187 and 188, in excess of ten microamperes per thousandth inch.

The measuring apparatus 100, as applied to the machine tool 200 in FIG. 5, does not afford a direct means for interpolating between individual division points on the gauge bar 101. Thus, in this application the measuring apparatus is utilized only to position the movable table 204 accurately with respect to the division points on the gauge bar. Further adjustment of the position of the table may be accomplished by other means, as by the usual linear adjustment on the lead screw of the machine. Another means for accomplishing this is to provide a linear adjustment in the mounting of either the gauge bar 101 or the sensing unit 130 to move either of these elements accurately, in an axial direction, within the limits of a single division element on the gauge bar. Thus, as shown in FIG. 5, the gauge bar 101 may be mounted at one end in a vernier adjustment device 196 that may be essentially similar to the operating mechanism of a conventional micrometer. Thus, the axial position of the gauge rod may be adjusted by the usual adjustment member, such as a knob 197. On the other hand, the same effect can be achieved electrically by an interpolation circuit such as that illustrated in the capacitive systen of FIG. 1; if this approach is adopted, careful calibration is important because of the non-linear operating characteristics of the system.

The measuring apparatus 100, like the device 10, is essentially a null-indication device. Consequently, the relationship of the axial length of the sensing elements, in this instance the transformer windings 137 and 142, to the axial lengths of the division elements on the gauge bar 101 is important. If the division elements are made relatively long as compared to the axial length of either sensing element, there can be substantial axial displacement between the gauge bar and the sensing unit without change in the electrical signal induced in the sensing winding. This introduces long "dead" spaces between null points, the only effective and accurate measurement points, and substantially reduces the effectiveness of the measuring apparatus. On the other hand, if the division elements are made substantially shorter than the sensing coils, it is not possible to achieve a sharp null indication of the kind illustrated in FIG. 6. That is, the null indication becomes elongated, with the result that precision measurement is rendered virtually impossible. If the division elements are foreshortened, relative to the sensing coils, so that several division elements fall within the length of one sensing element, then null-indication operation becomes virtually impossible and the division points cannot be located.

In order to obtain sharply defined nulls at each of the division points along the length of the bar 101 (FIG. 3), the axial length of the division elements relative to the axial length of the sesning coils should be such that both coils are coupled approximately at one-half of their peak coupling when the sensing elements are centered as shown in FIGS. 3 and 4. To this end, the total axial length of each of the sensing elements should be made equal to or somewhat smaller than the axial length of the division elements in order to avoid spreading of the null points or the creation of long "dead" spaces between null points.

Figure 8:
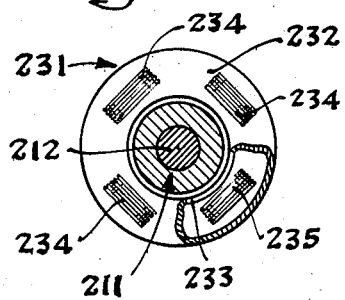
FIG. 8 is a partially cut-away view of a sensing unit used in the embodiment of FIG. 7.
Figure 7:
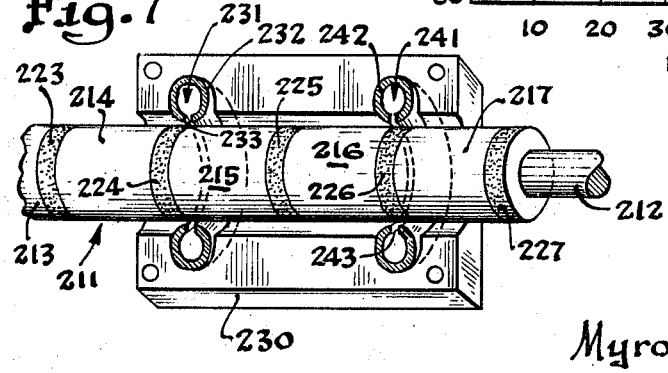
FIG. 7 is a simplified sectional view of another embodiment of the invention utilizing magnetic properties of a gauge member.

FIGS. 7 and 8 illustrate another magnetic embodiment of the present invention which in many respects is substantially similar to that of FIGS. 3 and 4. In this embodiment, the measuring apparatus comprises a gauge bar 211 (FIG. 7) which is quite similar to the gauge bar 101. Thus, the gauge member 211 includes a central support rod 212 upon which a first group of division elements 213, 214, 215, 216 and 217 are mounted in alternation with a second group of division elements 223, 224, 225, 226 and 227. The division elements 213–217 are formed from magnetic material and the division elements 223–227 are of non-magnetic material. In this instance, the diameters of the division elements from the two groups are equal, but the axial lengths are substantially different. That is, the magnetic division elements are substantially longer, in an axial direction, than the non-magnetic division elements.

The embodiment of FIG. 7 further includes a sensing unit comprising a housing 230 which may be of split construction. At one end of the housing 230 there is mounted a first sensing device 231 comprising a core 232 of toroidal configuration. The core 232 is disposed in an encompassing relation to the magnetic gauge bar 211, but does not make physical contact with the gauge bar. That is, the gauge assembly 211 extends through the window in the toroid formed by the core 232. The core 232 is of hollow cross-sectional configuration but is not a closed geometrical figure. Instead, the core is provided with a circular air gap 233 which faces the gauge bar 211. The sensing device 231 further includes one or more input windings, such as the windings 234, and one or more output windings, only the one winding 235 being illustrated (FIG. 8). Thus, the sensing device 231 is essentially similar to a reading head of the kind conventionally used for sensing and interpreting magnetically recorded data, as in magnetic tape or drum recording systems, except that the core is extended completely around the magnetic gauge bar 211.

The apparatus of FIG. 7 further includes a second sensing device 241 comprising a hollow toroidal core 242 having an air gap 243. As before, the core is disposed in encompassing relation to the gauge assembly 211, with the air gap facing the gauge bar. This sensing unit is also provided with suitable input and output windings, similar to the windings 234 and 235 on the first-described sensing unit (FIG. 8).

To complete the measuring apparatus of FIG. 7, the output windings of the two sensing units 231 and 241 may be connected in an operating circuit, such as that of FIG. 4, in essentially the same manner as the secondary windings 137 and 142 illustrated in that circuit. The axial spacing between the two sensing units should be made exactly equal to the spacing between an integral number of division elements. The arrangement shown in FIG. 7 is typical, the two air gaps of the sensing units being separated by a length equal to the combined length of the division elements 215, 216 and 225. An odd integral number of division elements should be selected to obtain direction-sensitive output signals, as in the embodiment of FIGS. 3 and 4.

The measuring apparatus of FIGS. 7 and 8, and particularly the gauge bar construction 211, is of rather specialized application and is intended for use where it is desirable to afford relatively long spacing between precision measurement points. Thus, with reference to FIG. 7, it will be seen that a substantial movement of the gauge bar 211 in either direction brings both of the sensing devices 231 and 241 into conjunction with magentic division elements of the gauge bar. As long as both sensing devices are aligned with magnetic gauge elements, it is not possible to obtain an accurate measurement indication. For general applications, in which a relatively large number of closely spaced precision measuring points are desired, the construction shown in FIG. 7 should be modified by reducing the axial length of the magnetic division elements 213–217 until they are comparable in length to the non-magnetic elements 223–227. In this manner, it is possible to obtain a substantially greater number of effective precision division points along the length of the gauge bar.

As in the embodiment of FIGS. 3 and 4 the relative effective lengths of the sensing elements and the gauge bar division elements are important. In this instance, the principal determining factor with respect to the effective length of each sensing device is the width of its air gap. For this reason, it is usually possible to obtain greater density of precision measurement points along the length of the gauge bar, using the apparatus of FIGS. 7 and 8, than with the transformer arrangement of FIGS. 3 and 4. On the other hand, the device of FIGS. 7 and 8 may require somewhat more accurate manufacurting control in order to avoid excessive or unequal tilting of the sensing devices relative to the axis of the gauge bar.

FIGS. 9 and 10 illustrate yet another embodiment of the present invention in which sensing is accomplished in accordance with changes in magnetic properties of the gauge bar division elements. The measuring apparatus 300 shown in these drawings comprises a magnetic gauge bar 301 which includes a central support rod 302. The rod 302 is preferably fabricated from steel and should have a relatively high permeability. On the rod 302 there are mounted a first group of division elements 311, 312, 313, 314 and 315 formed from a high permeability magnetic material. Thus, these elements correspond to the division elements 111–115 of the embodiment of FIG. 3. The gauge bar 301 further includes a second group of division elements 321, 322, 323, and 324 which are mounted on the support rod 302 alternately with the magnetic elements 311–315. As before, the division elements in each group must be substantially uniform in axial length and, preferably, the axial lengths selected for the two groups are the same. In this instance, however, the division elements 321–324 are fabricated from an electrically conductive material, preferably copper or other low resistance conductor. It is thus seen that the gauge bar 301 comprises a series of magnetic division elements separated from each other by conductive elements that, in effect, constitute shorted turns.

The basic construction for the gauge bar 301 is otherwise similar to the gauge bars described hereinabove. That is, suitable retaining means are provided at each end of the gauge bar and these retaining means are utilized to hold the entire division element assembly under compression. Thus, the retaining nuts or other similar devices on the gauge bar can be tightened to afford limited precision adjustment of the length of the bar.

The sensing unit 330 for the measuring apparatus 300 comprises an annular housing 331 of magnetic material having two internal annular cavities of substantially equal size, the two cavities being separated by a central rib 332 of magnetic material that may be an integral part of the housing 331. Within this housing there are mounted two sensing coils 333 and 334. The coils 333 and 334 are of annular configuration. Thus, the complete sensing unit 330 is provided with an axial aperture 335 through which the gauge bar 301 extends. As before, there is no physical contact between the sensing unit and the gauge bar. The housing 331 is shown as a single casting or other integral member, but can be constructed sectionally as long as suitable precautions are taken to assure that the housing is a complete low-permeability magnetic structure.

The operating circuit for the apparatus 300 is illustrated in FIG. 10. As shown therein, the two sensing coils 333 and 334 are connected in series with each other, the common terminal 337 of the two coils comprising one output terminal for the measuring apparatus. The end terminals of the coils 333 and 334 are connected to the end terminals of the secondary winding 338 of an input transformer 339. The secondary winding 338 of the input transformer is provided with a center tap 341 that constitutes a second output terminal for the measuring apparatus. The primary winding 342 of the input transformer 339 is connected to a suitable A.C. signal generator 343.

In considering the operation of the measuring apparatus 300, it may first be assumed that the sensing unit 330 is located in the position shown in FIGS. 9 and 10, relative to the gauge bar 301, with the junction between the magnetic division element 313 and the conductive ring 323 disposed in centered relation between the two sensing coils 333 and 334. With this alignment, the flux linkage through the magnetic housing legs 332 and 344 (FIG. 9) affords a relatively low reluctance path. That is, there is a strong flux linkage for the sensing coil 333. On the other hand, the flux linkage for the coil 334, through the housing legs 332 and 345, is extremely weak due to the presence of the shorted turn 323. As a consequence, an unbalanced signal of substantial magnitude appears at the output terminals 337 and 341 of the operating circuit, FIG. 10.

The gauge bar 301 may be moved to center one of the magnetic division elements, such as the element 313, beneath the center leg 332 of the sensing unit magnetic structure. When the magnetic element is exactly and accurately centered, the coupling for the two coils 333 and 334 is exactly equal and the output signal appearing at the terminals 337 and 341 is essentially zero. In other words, a null is detected each time one of the magnetic division elements is precisely and accurately centered with respect to the sensing means 330.

On the other hand, the bar 301 may be moved relative to the sensing means 330 to bring one of the shorted-turn division elements such as the element 323 into centered alignment with respect to the sensing means. Again, once accurate centering is achieved, the coupling for the two sensing coils 333 and 334 is equal and the output signal across the terminals 337 and 341 is zero. Thus, a second series of null points is identifiable in the operation of the measuring apparatus 300.

With respect to the embodiments of FIGS. 9 and 10, the same basic considerations apply with respect to the relative axial lengths of the gauge bar division elements and the sensing means. Thus, if the magnetic division elements 311–315 are made relatively long, as compared with the overall length of the sensing means in an axial direction, then the balanced or null condition achieved when one of the magnetic elements is centered in the sensing means is broadened to an extent such that precision measurement becomes virtually impossible. The same consideration applies with respect to elongation of the shorted turn conductive elements 321–324. On the other hand, if the division elements are made substantially shorter than the sensing coils, an equally disadvantageous deterioration in operation occurs. The sensing elements, having multiple division elements aligned therewith, perform an averaging operation that precludes precise null-sensing operation and, hence, fails to achieve the precision positioning described above.

In each of the several embodiments of the invention, the basic gauge member includes a rather large number of individual division elements; the dimensions of these individual gauge or division elements determine the location of the critical division points along the gauge member. Moreover, the sum of the dimensions of the division elements determines the total length of the gauge member. The total length of the gauge member is subject to some adjustment, but a substantial cumulative error, such as would occur if a substantial number of division elements were over-size and none were under-size, would probably produce a total error which could not be corrected by the compression adjustment. For maximum accuracy in the construction of the gauge member, the individual division elements should be manufactured to rigid specifications, but with all tolerances expressed as plus tolerances. In addition, the individual division elements should be gauged to very close limits and then sorted in accordance with the amounts by which they vary from the desired standard. When a gauge bar is assembled, a combination of tolerance elements can then be selected to keep the sum of the variations in the entire length of the gauge member to a minimum and, indeed, practically to zero. It should be noted that this gauging and sorting operation is not particularly expensive, but does add materially to the ultimate accuracy of the gauge member.

With respect to temperature compensation of the gauge member, it is possible to select materials for formation of the division elements which are closely matched, in thermal co-efficient of expansion, to the machine with which they will be used. On the other hand, this is not the only way to achieve effective temperature compensation. Moreover, it may not be the best way, particularly because of the limitations imposed upon the gauge member in obtaining the desired field-coupling properties for the two different groups of division elements used in any embodiment of the invention. Another means for effecting thermal compensation, which may be adopted with any of the gauge members described hereinabove, entails the use of division element materials having mutually compensating thermal expansion characteristics. For example, it may be assumed that the desired gauge assembly is of the form illustrated by the gauge assembly 101 (FIGS. 3 and 4) requiring the use of magnetic and non-magnetic division elements. Furthermore, it may be necessary to match the assembly, thermally, to a chromium steel having a thermal co-efficient of expansion of $6 \times 10^{-6}$ per degree centigrade. A satisfactory thermal match can be achieved using non-magnetic stainless steel division elements having a thermal co-efficient of expansion of $12 \times 10^{-6}$ per degree centigrade and Invar magnetic division elements having a thermal co-efficient of approximately zero.

In like manner, the material selected for the main support rod of the gauge member may have some effect upon the effective thermal co-efficient of expansion of the gauge assembly. Thus, a support rod having a very low thermal co-efficient of expansion can be utilized to offset an unwanted high expansion rate in the division elements by increasing the amount of compression applied to the division elements as the temperature of the gauge assembly is increased.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:
1. A measuring apparatus comprising:
   a first plurality of division elements of high-permeability magnetic material, having uniform field-altering properties and uniform dimensions;
   a second plurality of division elements of low-permeability material, having uniform field-altering properties and uniform dimensions;
   means for mounting said division elements in a rigid assembly in fixed longitudinal alignment with each other and in abutting relation to each other, the division elements from said first and second pluralities being disposed in alternation in said assembly, the total effective length of the assembly being the sum of the lengths of said division elements;
   two sensing transformers, each including a primary winding and a secondary winding, mounted in a sensing assembly in fixed spaced relation to each other and each disposed in spaced encompassing relation to said division element assembly, said sensing assembly being longitudinally movable along said division element assembly;
   said sensing transformers each having a total effective length similar to the length of the shorter ones of said individual division elements, said division elements each altering the magnetic fields adjacent said sensing transformers to vary the amplitude of electrical signals induced in said secondary windings of said sensing transformers;
   and circuit means connected to said secondary windings of said sensing transformers for deriving a control signal indicative of the position of said sensing assembly along said division element assembly.

2. A measuring apparatus according to claim 1 in which each of said sensing transformers comprises a toroidal core of magnetic material having a window through which said division element assembly extends in paraxial relation, each of said cores being C-shaped in cross-sectional configuration with an air gap facing said division element assembly, the width of the air gap being no greater than the length of the shorter ones of said division elements, said primary and secondary windings of each transformer being mounted on the toroidal core for that transformer.

3. A measuring apparatus comprising:
   a first plurality of division elements of high-permeability magnetic material having uniform dimensions;
   a second plurality of division elements of low-permeability material having uniform dimensions;
   means for mounting said division elements in a rigid assembly in fixed longitudinal alignment with each other and in abutting relation to each other, the division elements from said first and second pluralities being disposed in alternation in said assembly, the total effective length of the assembly being the sum of the lengths of said division elements;
   a pair of sensing transformers each including a primary winding and a secondary winding, both of said windings being disposed in spaced encompassing paraxial relation to said division element assembly, corresponding ones of said primary and secondary windings being split and disposed on opposite sides of the other winding, said transformers being mounted in a sensing assembly longitudinally movable along said division element assembly;
   said sensing transformers being displaced from each other, longitudinally of said division element assembly, by a distance equal to the total length of an odd integral number of division elements and each transformer having a length approximately equal to the length of an individual division element of the plurality of division elements having the shortest axial lengths;
   and null-sensing circuit means connected to the secondary windings of said sensing transformers for deriving a control signal indicative of the position of said sensing assembly along said division element assembly, said secondary windings being connected in series bucking relation therein.

4. A measuring apparatus comprising:
   a first plurality of electrically conductive division elements of circular external configuration and having uniform dimensions;
   a second plurality of dielectric division elements of circular external configuration and having uniform dimensions, the axial lengths of division elements of said first and second pluralities being equal;

means for mounting said division elements in a rigid assembly in fixed coaxial longitudinal alignment with each other and in abutting relation to each other, the division elements from said first and second pluralities being disposed in alternation in said assembly in matched pairs to afford a plurality of precisely located base points along the division element assembly, the total effective length of the assembly being the sum of the lengths of said division elements;

three individual sensing means each comprising an annular electrically conductive ring electrode, having a length similar to the length of a single division element, disposed in paraxial spaced encompasing relation to said division element assembly, said ring electrodes being mounted in a sensing assembly in fixed axially spaced relation to each other and axially displaced from each adjacent electrode by a distance equal to the total length of an odd integral number of division elements, said sensing assembly being longitudinally movable along said division element assembly;

energizing circuit means, connected to said conductive division elements, for applying an alternating current energizing signal in phase opposition to alternate ones of said conductive division elements to induce electrical signals in said ring electrodes;

and further circuit means connected to said ring electrodes for deriving a control signal indicative of the position of said sensing assembly along said division element assembly relative to said base points.

References Cited by the Examiner

UNITED STATES PATENTS

| | | | |
|---|---|---|---|
| 1,910,957 | 5/1933 | Llewellyn | 336—20 |
| 2,132,183 | 10/1938 | Oakley | 340—200 |
| 2,294,881 | 9/1941 | Alford | 340—195 |
| 2,430,757 | 11/1947 | Conrad | 340—196 |
| 2,611,964 | 9/1952 | Buisson | 340—200 |
| 2,614,164 | 10/1952 | Huston | 340—199 |
| 3,071,758 | 1/1963 | Wolfendale | 340—200 |

NEIL C. READ, *Primary Examiner.*

THOMAS B. HABECKER, *Examiner.*